(12) United States Patent
Akiyama (10) Patent No.: US 7,161,740 B2
(45) Date of Patent: Jan. 9, 2007

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/174,650

(22) Filed: Jul. 6, 2005

(65) Prior Publication Data

US 2006/0007521 A1 Jan. 12, 2006

(30) Foreign Application Priority Data

Jul. 8, 2004 (JP) .............................. 2004-201884
Apr. 13, 2005 (JP) .............................. 2005-115392

(51) Int. Cl.
*G02B 3/00* (2006.01)
*G02F 1/07* (2006.01)
*G02F 1/1335* (2006.01)
*G03B 21/26* (2006.01)

(52) U.S. Cl. .......................... 359/649; 359/253; 349/8; 353/34

(58) Field of Classification Search ................ 359/253, 359/265, 272, 275, 649; 349/5, 8; 353/31, 353/34
See application file for complete search history.

(56) References Cited

U.S. PATENT DOCUMENTS 7,055,961 B1* 6/2006 Huibers ........................ 353/84

2005/0185144 A1* 8/2005 Imahase et al. ............... 353/31

FOREIGN PATENT DOCUMENTS

JP  A-09-120067   5/1997
JP  A-2002-148712 5/2002

OTHER PUBLICATIONS

Taiichiro Kurita; "Picture Quality of Hold Type Display for Moving Images"; Technical Report of IEICE; The Institute of Electronics, Information and Communication Engineers; Jun. 1999; pp. 55-60. (with abstract and translation).

* cited by examiner

*Primary Examiner*—Ricky Mack
*Assistant Examiner*—William Choi
(74) *Attorney, Agent, or Firm*—Oliff & Berridge, PLC (57) ABSTRACT

Aspects of the invention can provide a projector including an illumination system, an electro-optic modulator, and a projection system. The illumination system can include device that emits a substantially parallel illumination light beam to the side of an illuminated region, a first lens array that has plural small lenses for dividing the illumination light beam into a plurality of partial light beams, a second lens array that has plural small lenses corresponding to the plural small lenses of the first lens array, a polarization conversion element for converting into polarized light an unpolarized light included in the illumination light beam emerging from the second lens array, and a superposition lens for superposing the partial light beams on the illuminated region. The electro-optic modulator can modulate the illumination light beam in response to image information. The projection system can project the illumination light beam modulated by the electro-optic modulator.

10 Claims, 8 Drawing Sheets

PROJECTOR

This application claims the benefit of Japanese Patent Applications No. 2004-201884 filed Jul. 8, 2004 and 2005-115392 filed Apr. 13, 2005. The entire disclosure of the prior applications is hereby incorporated by reference herein in its entirety.

BACKGROUND

Figure 9A:
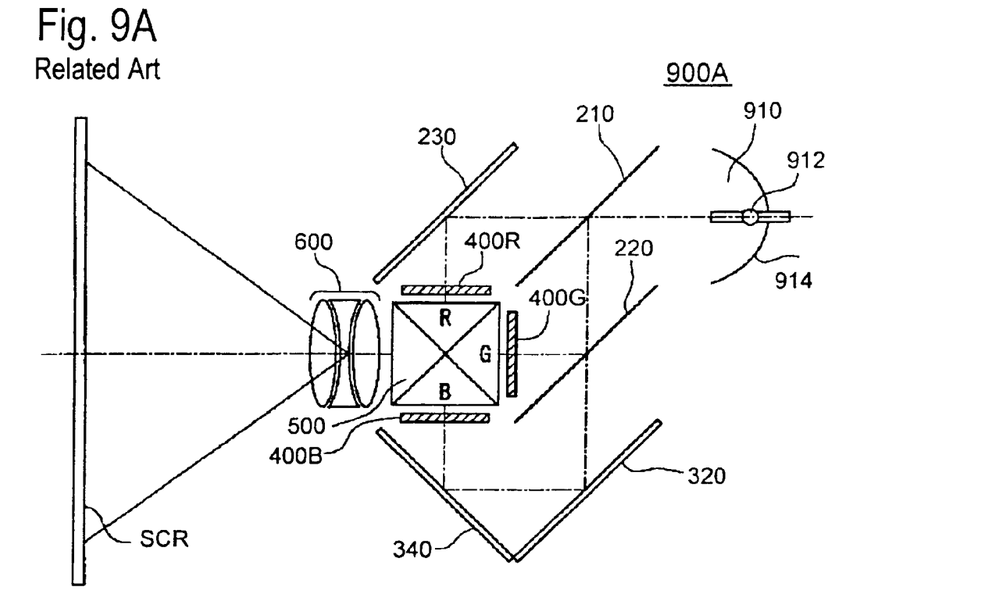
FIGS. 9(a) to 9(c) illustrate a related art projector.
Figure 9B:
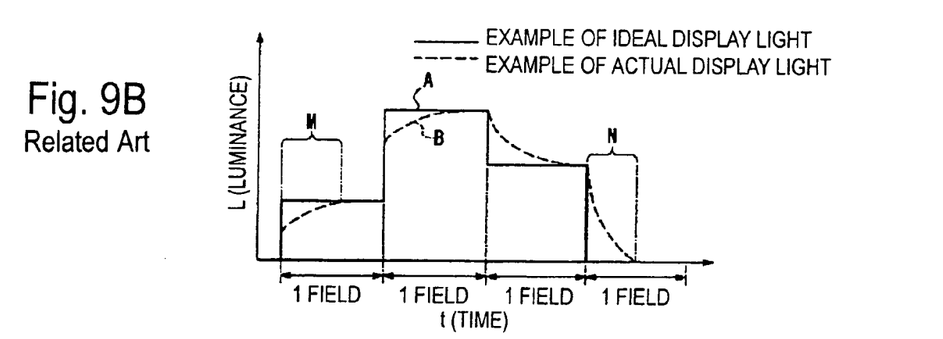
Figure 9C:
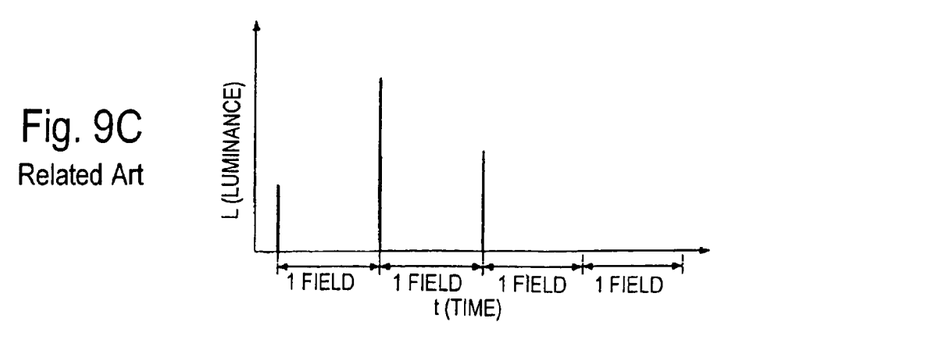

Aspects of the invention can relate to a projector. FIGS. 9(a) to 9(c) illustrate a related art projector. FIG. 9(a) is a view showing the optical system of the related art projector, and FIGS. 9(b) and 9(c) are diagrams illustrating a problem of such a related art projector.

In this projector 900A, liquid crystal devices 400R, 400G, and 400B are a hold type display having brightness characteristics as shown in FIG. 9(b). Therefore, unlike a CRT that is an impulse type display having brightness characteristics as shown in FIG. 9(c), the projector 900A has the problem that smooth movie display cannot be obtained due to a so-called persistence of vision. See, for example, "Image Quality of Movie Display of Hold Type Display" (Pages 55 to 60 (1999–06) in Technical Report EID99-10 of the Institute of Electronics, Information and Communication Engineers).

Figure 10A:
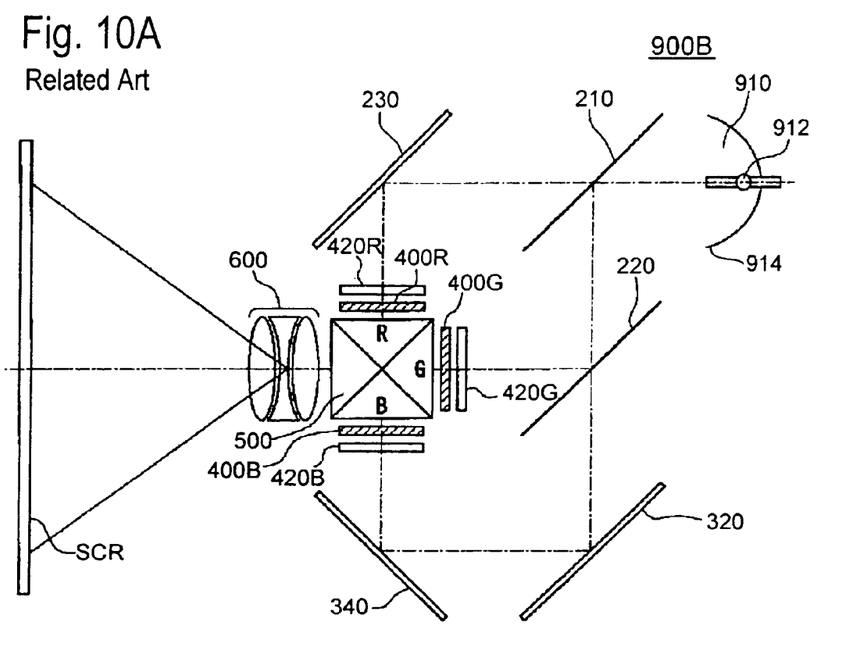
FIGS. 10(a) to 10(c) illustrate another related art projector.
Figure 10B:
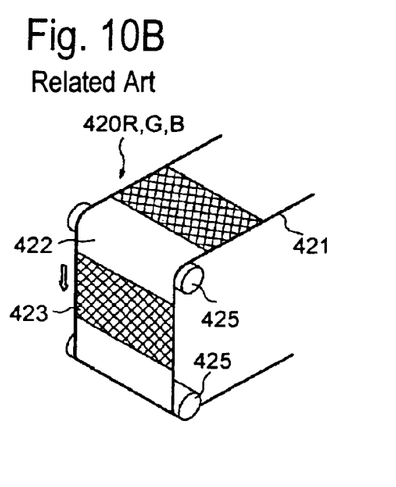
Figure 10C:
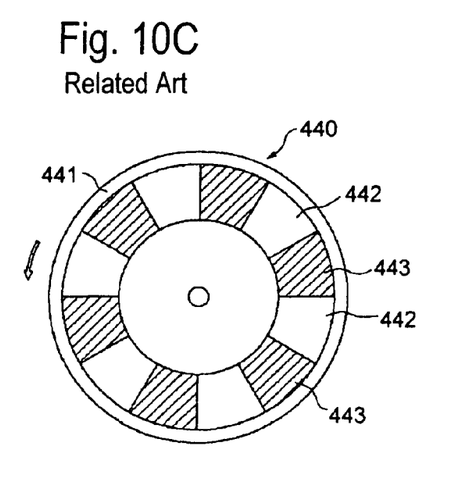

FIGS. 10(a) to 10(c) illustrate another related art projector. FIG. 10(a) is a view showing the optical system of the another related art projector, and FIGS. 10(b) and 10(c) are views showing an optical shutter used in such another related art projector.

In this projector 900B, as shown in FIG. 10(a), optical shutters 420R, 420G, and 420B are disposed on the light incidence sides of liquid crystal devices 400R, 400G, and 400B, respectively, and are configured to shut light on and off, thus solving the aforesaid problem. That is, the projector 900B is configured such that smooth and high-quality movie display can be obtained by reducing the so-called persistence of vision. See, for example, JP-A-2002-148712 (FIGS. 1 to 7).

However, such another related art projector is configured to cause the optical shutters to shut light on and off and therefore has the problem of a significant reduction in light usability.

SUMMARY

Aspects of the invention can provide a projector that does not significantly suffer from reduced light usability, even when configured to be capable of obtaining a smooth and high-quality movie display. Such a projector can include a illumination system, an electro-optic modulator, and a projection optical system. The illumination system can include a light source device that emits a substantially parallel illumination light beam to the side of an illuminated region, a first lens array that has plural small lenses for dividing the illumination light beam emitted from the light source device into a plurality of partial light beams, a second lens array that has plural small lenses corresponding to the plural small lenses of the first lens array, a polarization conversion element for converting into a polarized light an unpolarized light included in the illumination light beam emerging from the second lens array, and a superposition lens for superposing the partial light beams emerging from the polarization conversion element on the illuminated region. The electro-optic modulator can modulate the illumination light beam emerging from the illumination system in response to image information. And, the projection optical system can project the illumination light beam modulated by the electro-optic modulator.

In order that the illumination light beam emerging from the illumination system is formed to have a cross section shape such as to illuminate all of an image formation region of the electro-optic modulator in one of vertical and horizontal directions of the image formation region and such as to illuminate part of the image formation region in the other direction, the small lenses of the first lens array have a planar shape compressed in the other direction.

The exemplary projector can further include between the illumination system and the electro-optic modulator, a scanner that scans the illumination light beam along the other direction, on the image formation region, in synchronism with a frame rate of the electro-optic modulator.

In the exemplary projector, the light source device can further include a light emitting tube having a light emitting portion, an ellipsoidal reflector, a parallelization lens, and an auxiliary mirror. The ellipsoidal reflector reflects a light emitted from the light emitting portion. The parallelization lens converts the light reflected off the ellipsoidal reflector into a substantially parallel light. And, the auxiliary mirror reflects the light emitted from the light emitting portion to the illuminated region side onto the light emitting portion. Besides, the auxiliary mirror can have the shape in which part of its reflective concave surface is removed so that, in the cross section of the illumination light beam on the light incidence surface of the first lens array, the length thereof along the other direction becomes shorter than the length thereof along the one direction.

Consequently, according to an aspect of the projector of the invention, the illumination light beam can have a cross section shape as to illuminate all of the image formation region in one of vertical and horizontal directions of the image formation region of the electro-optic modulator, and such as to illuminate part of the image formation region in the other direction. Thus, the illumination light beam having such a cross section shape (i.e., the cross section shape compressed in the other direction) becomes capable of being scanned along the other direction, on the image formation region, in synchronism with the frame rate of the electro-optic modulator. Therefore, a light irradiation region and a light non-irradiation region become sequentially alternately scrolled in the image formation region of the electro-optic modulator. Resulting, the persistence of vision is reduced, thus providing a projector capable of obtaining smooth and high-quality movie display.

Besides, according to the projector of an aspect of the invention, the illumination light beam having the cross section shape compressed in the other direction as aforesaid is realized by using the first lens array including the small lenses having the planar shape compressed in the other direction. Therefore, unlike the case in which the optical shutter is used, the illumination light beam emitted from the light source device becomes capable of being led to the image formation region of the electro-optic modulator without any waste, thus eliminating a significant reduction in light usability. Consequently, the projector of an aspect of the invention can provide a projector that is not significantly reduced in light usability even when configured capable of obtaining smooth and high-quality movie display, thus achieving the advantage of the invention.

Besides, according to the projector of an aspect of the invention, in the cross section shape of the illumination light beam reflected off the ellipsoidal reflector, the dimension thereof in the other direction becomes smaller than that in the one direction. Accordingly, it is possible to reduce the dimension, along the other direction, of each downstream optical system including the parallelization lens, first lens array, second lens array, polarization conversion element, and superposition lens. Thus, a reduction in size of the entire apparatus can be achieved. Besides, the cross section shape of the illumination light beam reflected off the ellipsoidal reflector becomes compatible with the cross section shape of the small lenses of the first lens array which shape is compressed in the other direction.

An electro-optic modulator, in which the planar shape of its image formation region is a rectangle in which the vertical dimension:the horizontal dimension=3:4 and a rectangle in which the vertical dimension:the horizontal dimension=9:16, is widely used as the electro-optic modulator. Therefore, for example, the planar shape of a rectangle in which the vertical dimension:the horizontal dimension=3:8, the planar shape of a rectangle in which the vertical dimension:the horizontal dimension=9:32, the planar shape of a rectangle in which the vertical dimension:the horizontal dimension=1:4, and like planar shape can be suitably used as the planar shape of the small lenses of the first lens array of the projector of an aspect of the invention.

It is preferable that, when it is assumed that the light emitted from the light emitting portion is not reflected off but transmitted through the auxiliary mirror, the ellipsoidal reflector has the shape in which a portion of its reflective concave surface required to reflect the transmitted light is removed.

It is preferable that the plural small lenses of the first lens array are arrayed within a plane perpendicular to the central axis of the illumination light beam and within a substantially rectangular region in which the length along the other direction is shorter than the length along the one direction. In this case, preferably the cross section shape of the illumination light beam emerging from the illumination system substantially matches the shape of the substantially rectangular region in which the plural small lenses of the first lens array are arrayed, and the auxiliary mirror is shaped to have its lengthwise direction in the other direction.

It is preferable that the ellipsoidal reflector is shaped to have a lengthwise direction in the one direction. Such a configuration can cause the illumination light beam to efficiently fall on the region where the plural small lenses are arrayed and also can reduce the dimension of the ellipsoidal reflector along the other direction, thus enabling a further reduction in size of the entire apparatus.

Besides, it is preferable that, in the cross section of the illumination light beam on the light incidence surface of the first lens array, the ratio of the length along the other direction to the length along the one direction is 30% to 80%.

When this ratio is less than 30%, it follows that the light usability of the illumination light beam emerging from the ellipsoidal reflector is difficult to maintain. At the same time, it can prevent or reduce the number of rows of the small lenses of the first lens array from being secured, thus making it difficult to uniform a light intensity distribution on the electro-optic modulator. In contrast, when this ratio exceeds 80%, it reduces the effect of enabling a reduction in size of the apparatus. From these viewpoints, more preferably, the aforesaid ratio is 40% to 70%.

Besides, it is preferable that the plural small lenses of the first lens array are arrayed in four columns along the one direction.

With such a configuration, since the small lenses of the first lens array are arrayed in four columns along the one direction, the light intensity distribution of the illuminated region of the electro-optic modulator can be made uniform to a certain degree. Besides, since the small lenses of the first lens array are arrayed in four columns along the one direction, the size of the small lenses can be made larger than a certain magnitude. Consequently, the length of sides of the small lenses of the first lens array along the other direction is prevented from being excessively shortened. Resulting, the partial light beams emerging from the small lenses of the first lens array become satisfactorily sucked into the opposite second lens array, thus making it possible to obtain satisfactory light usability.

Besides, it is preferable that the plural small lenses of the first lens array are arrayed in 8 to 10 rows along the other direction. With such a configuration, the length of sides of the small lenses of the first lens array along the other direction is prevented from being excessively shortened. Therefore, the partial light beams emerging from the small lenses of the first lens array become satisfactorily sucked into the opposed second lens array, thus making it possible to obtain satisfactory light usability.

Besides, it is preferable that the first lens array, having its light incidence surface nearer the ellipsoidal reflector side in relation to a second focal point of the ellipsoidal reflector, is disposed at a position such that the quantity of light of the illumination light beam emitted from the light source device is distributed entirely on the light incidence surface. With such a configuration, the quantity of light of the illumination light beam emitted from the light source device is distributed entirely on the light incidence surface of the first lens array. Accordingly, even if the small lenses are arrayed in four columns to thereby cause the first lens array to have low lens density, an in-plane light intensity distribution characteristic on the illuminated region of the electro-optic modulator is prevented from being reduced. Thus, a simplification in manufacturing process and reduction in cost of the first lens array can be achieved.

In this case, preferably, the first lens array is disposed at a position such that no region (shadowed region) of excessively small incidence light intensity exists in a central portion of the light incidence surface of the first lens array. With such a configuration, the quantity of light of the illumination light beam emitted from the light source device becomes distributed entirely on the light incidence region of the first lens array.

Besides, the projector according to an aspect of the invention further comprises between the illumination system and the electro-optic modulator, a color separation optical system for separating the illumination light beam emerging from the illumination system into a plurality of color lights. In this case, preferably, a plurality of electro-optic modulators for modulating the plurality of color lights emerging from the color separation optical system, in response to image information corresponding to the respective color lights, are provided as the electro-optic modulator. Such a configuration makes it possible that the projector, which is not significantly reduced in light usability even when configured capable of obtaining smooth and high-quality movie display, provides a full-color projector (e.g., of three panels type) excellent in image quality.

Besides, it is preferable that the scanner, disposed at a position, substantially conjugate to the electro-optic modulator, between the illumination system and the color separation optical system, includes a rotating prism that has a rotational axis perpendicular to an illumination optical axis. In this case, preferably, the rotating prism is configured to rotate to thereby scroll a light irradiation region and a light non-irradiation region sequentially on the electro-optic modulator in synchronism with the frame rate of the electro-optic modulator. Such a configuration makes it possible that the smooth operation of scrolling the light irradiation region and the light non-irradiation region is realized in the image formation region of each of the electro-optic modulators of the full-color projector.

BRIEF DESCRIPTION OF THE DRAWINGS

The invention will be described with reference to the accompanying drawings, wherein like numbers references like elements, and wherein.

DETAILED DESCRIPTION OF EMBODIMENTS

A projector of the invention will hereinafter be described with reference to the exemplary embodiments shown in the accompanying drawings.

Figure 1A:
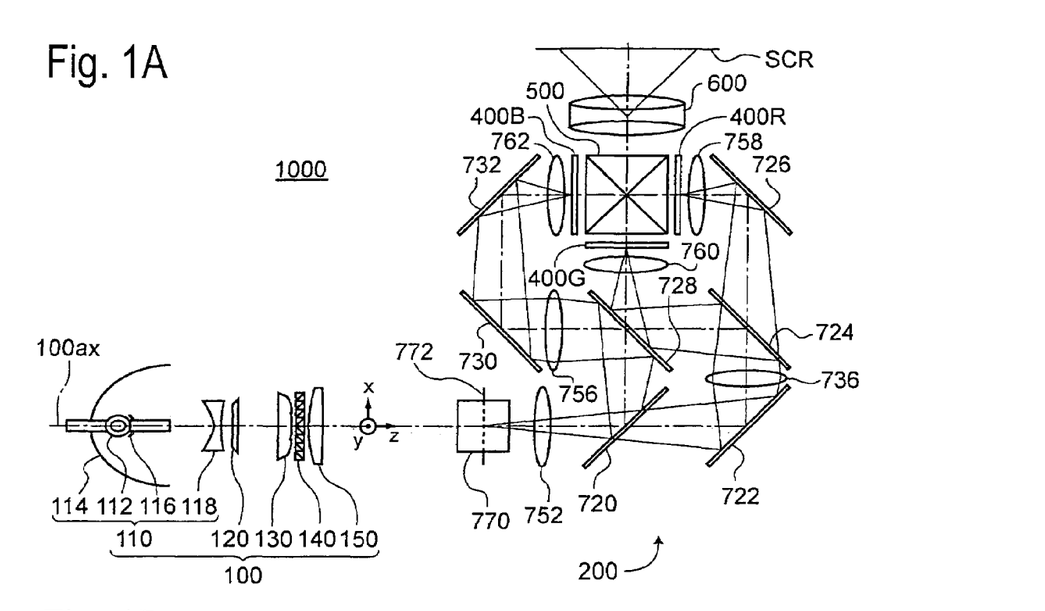
FIGS. 1(a) to 1(c) illustrate a projector of an exemplary embodiment.
Figure 1B:
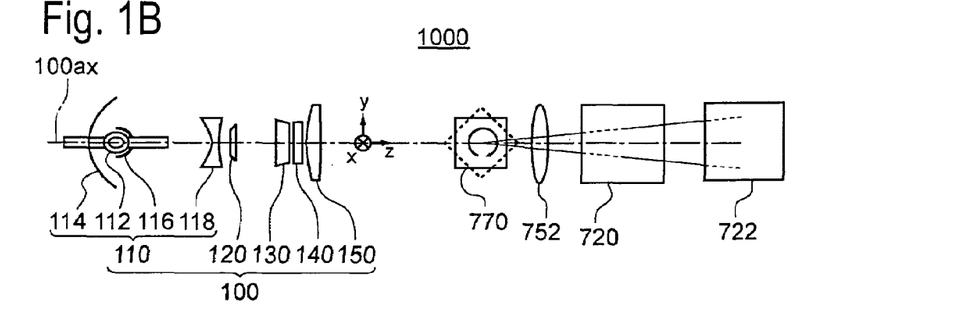
Figure 1C:
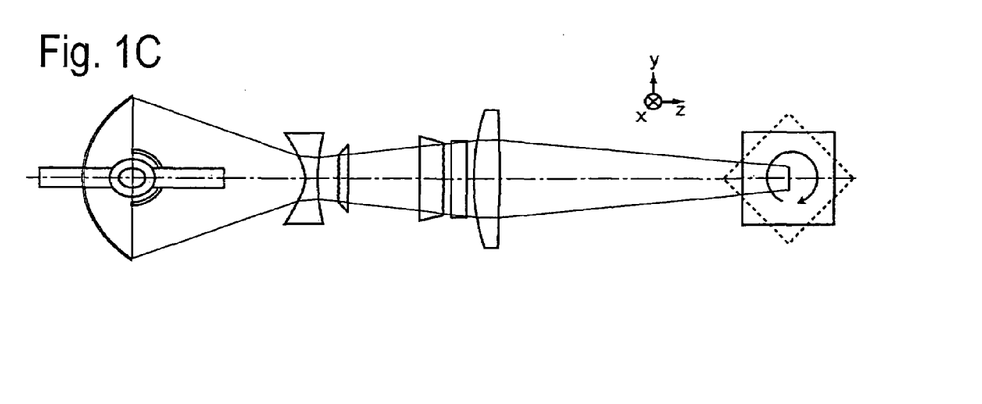

FIGS. 1(a) to 1(c) illustrate a projector of an exemplary embodiment. FIG. 1(a) is a top view of an optical system of the projector of an exemplary embodiment, FIG. 1(b) a side view of the optical system, and FIG. 1(c) a view illustrating a illumination system of the projector of the exemplary embodiment.

In the following description, three mutually perpendicular directions refer to a z-axis direction, an x-axis direction, and a y-axis direction. The z-axis direction is an illumination optical axis direction in FIG. 1(a). The x-axis direction is a direction parallel to the plane of FIG. 1(a) and perpendicular to the z axis. And, the y-axis direction is a direction perpendicular to the plane of FIG. 1(a) and perpendicular to the z axis.

As shown in FIGS. 1(a) and 1(b), the projector 1000 of the exemplary embodiment can include the illumination system 100, a color separation optical system 200, three liquid crystal devices 400R, 400G, and 400B, a cross dichroic prism 500, and a projection optical system 600. The color separation optical system 200 separates an illumination light beam from the illumination system 100 into three color lights of red, green, and blue. The three liquid crystal devices 400R, 400G, and 400B, serving as the electro-optic modulators, modulate the three respective color lights separated by the color separation optical system 200, in response to image information. The cross dichroic prism 500 combines the color lights modulated by these three liquid crystal devices 400R, 400G, and 400B. And, the projection optical system 600 projects the light combined by the cross dichroic prism 500 onto a projection screen, such as a screen SCR.

As shown in FIGS. 1(a) and 1(b), the illumination system 100 has a light source device 110, a first lens array 120, a second lens array 130, a polarization conversion element 140, and a superposition lens 150. The light source device 110 emits a substantially parallel illumination light beam to the side of an illuminated region. The first lens array 120 has plural small lenses 122 (see FIGS. 3(a) to 3(c)) for dividing the illumination light beam emitted from the light source device 110 into a plurality of partial light beams. The second lens array 130 has plural small lenses 132 (not shown) corresponding to the plural small lenses 122 of the first lens array 120. The polarization conversion element 140 is for converting the illumination light beam to have substantially one kind of linear polarization. And, the superposition lens 150 is for superposing the partial light beams emerging from the polarization conversion element 140 on one another in the illuminated region.

As shown in FIGS. 1(a) and 1(b), the light source device 110 can have an ellipsoidal reflector 114, a light emitting tube 112, and a parallelization lens 118. The light emitting tube 112 has a light emitting center in the vicinity of a first focal point of the ellipsoidal reflector 114. And, the parallelization lens 118 converts a converging light reflected off the ellipsoidal reflector 114 into a substantially parallel light. The light emitting tube 112 is provided with an auxiliary mirror 116 as a reflector that reflects a light emitted from the light emitting tube 112 to the illuminated region side, in the direction of the ellipsoidal reflector 114.

The light source device 110 emits the illumination light beam having an illumination optical axis 100ax as its central axis.

The first lens array 120, including the plural small lenses 122 arrayed within a plane perpendicular to the illumination optical axis 100ax, divides the illumination light beam emerging from the light source device 110 into a plurality of partial light beams corresponding to the plural small lenses.

The second lens array 130 can include the plural small lenses 132 arrayed within a plane perpendicular to the illumination optical axis 100ax. The small lenses 132, corresponding to the partial light beams divided by the first lens array, collect the partial light beams so that the partial light beams fall on a polarization separation surface of the polarization conversion element 140.

The polarization conversion element 140 can include the polarization separation surface, a reflecting surface, and a phase plate. The polarization separation surface directly transmits an illumination light beam of a first polarization component out of two polarization components included in the illumination light beam, and reflects an illumination light beam of a second polarization component in a direction perpendicular to the illumination optical axis 100ax. The reflecting surface reflects the second polarization component in a direction parallel to the illumination optical axis. And, the phase plate converts one of the first and second polarization components into the other. The partial light beams emerging from the second lens array 130 are converted by the polarization conversion element 140 to have substantially one kind of linear polarization. Consequently, this action of the polarization conversion element 140 makes it possible to convert the illumination light beam into a polarized light having the polarization axis of one of the two polarization components. Therefore, this provides an illumination light beam suitable for the case in which electro-optic modulators of the type using a polarized light, such as liquid crystal devices, are used as the electro-optic modulators, as in the liquid crystal devices 400R, 400G, and 400B of the projector 1000 of the exemplary embodiment.

The superposition lens 150 is an optical system that superposes the plurality of partial light beams emerging from the polarization conversion element 140 on one another in the vicinity of an in-plane perpendicular to the illumination optical axis 100ax including a rotational axis 772 of a rotating prism 770. By rotating the rotating prism 770 around the rotational axis 772, moves the position where the incident illumination light beam passes through an in-plane perpendicular to the illumination optical axis 100ax and adjacent to the rotational axis 772. Thereby, an illumination region and a non-illumination region on an image formation region of each of the liquid crystal devices 400R, 400G, and 400B are scrolled.

The ellipsoidal reflector 114 and auxiliary mirror 116 of the light source device 110, the first lens array 120, and the rotating prism 770 will be described later in detail.

The illumination light beam emerging from the rotating prism 770 enters the color separation optical system 200.

As shown in FIGS. 1(a) and 1(b), the color separation optical system 200 uses an optical system having equal lengths of the optical passes from the illumination system 100 to the liquid crystal devices 400R, 400G, and 400B, respectively.

As shown in FIG. 1(a), the color separation optical system 200 has dichroic mirrors 720, 724, reflecting mirrors 722, 726, 728, 730, and 732, relay lenses 752, 736, and 756, and field lenses 758, 760, and 762. The relay lenses 752, 736, and 756 are optical elements that image the illumination light beam emerging from the rotating prism 770 onto the image formation regions of the liquid crystal devices 400R, 400G, and 400B. The field lenses 758, 760, and 762 are provided to convert the partial light beams into light beams substantially parallel to respective principal rays.

The dichroic mirror 720 transmits a red light component and a green light component of the light emerging from the rotating prism 770 and reflects a blue light component. The blue light component reflected off the dichroic mirror 720 is reflected off the reflecting mirrors 728, 730, and 732 and reaches the liquid crystal device 400B for blue light. In contrast, the red and green light components transmitted through the dichroic mirror 720 are reflected off the reflecting mirror 722 and falls on the dichroic mirror 724. The dichroic mirror 724 transmits the red light component and reflects the green light component. The red light component transmitted through the dichroic mirror 724 is reflected off the reflecting mirror 726 and reaches the liquid crystal device 400R for red light. Besides, the green light component reflected off the dichroic mirror 724 is further reflected off the reflecting mirror 728 and reaches the liquid crystal device 400G for green light.

The liquid crystal devices 400R, 400G, and 400B, each of which modulates the illumination light beam in response to the image information and forms an image per color light, provide the illumination targets of the illumination system 100. Although omitted from the illustration, incidence-side polarizing plates are interposed between the field lenses 244, 246, 248 and the liquid crystal devices 400R, 400G, 400B, respectively. And, emergence-side polarizing plates are interposed between the liquid crystal devices 400R, 400G, 400B and the cross dichroic prism 500, respectively. These incidence-side polarizing plates, liquid crystal devices 400R, 400G, 400B, and emergence-side polarizing plates perform light modulation of the incident color lights.

The liquid crystal devices 400R, 400G, and 400B each have a liquid crystal, which is an electro-optic material, hermetically sealed between a pair of transparent glass substrates. In accordance with a given image signal, the liquid crystal devices 400R, 400G, and 400B each modulate the polarization direction of one kind of linear polarization emerging from the incidence-side polarizing plate, using, for example, a polysilicon TFT as a switching element.

Wide-vision liquid crystal devices having a planar shape of a rectangle in which the vertical dimension along the y-axis direction:the horizontal dimension along the x-axis direction=9:16 are used as the liquid crystal devices 400R, 400G, and 400B.

The cross dichroic prism 500 can be an optical element that combines optical images modulated one for each of the color lights emerging from the emergence-side polarizing plates and forms a color image. This cross dichroic prism 500 forms a substantially square shape in plan obtained by bonding four right-angle prisms together. And, a dielectric multilayer is formed on each of substantially X-shaped interfaces obtained by bonding the right-angle prisms together. The dielectric multilayer formed on one of the substantially X-shaped interfaces reflects the red light, whereas the dielectric multilayer formed on the other interface reflects the blue light. The red light and the blue light are refracted by these dielectric multilayers and thus aligned with the direction of travel of the green light, thereby combining the three color lights.

The color image emerging from the cross dichroic prism 500 is magnified and projected by the projection optical system 600, thus forming a large screen image on the screen SCR.

The ellipsoidal reflector 114, auxiliary mirror 116, first lens array 120, and rotating prism 770 of the projector 1000 of the exemplary embodiment will hereinafter be described in detail.

1. First Lens Array

Figure 3A:
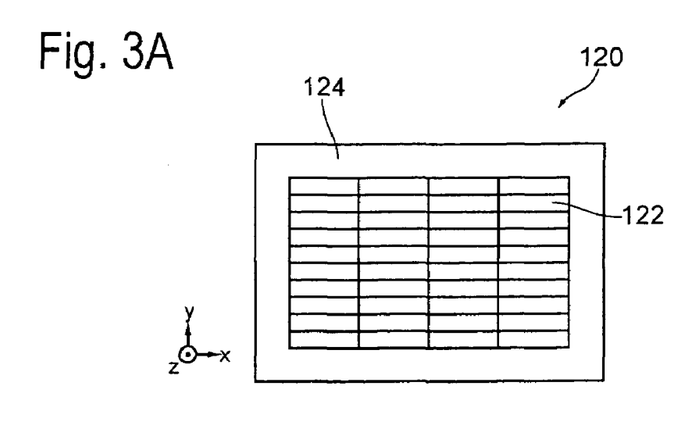
FIGS. 3(a) to 3(c) illustrate the structure of a first lens array of an exemplary embodiment.
Figure 3B:
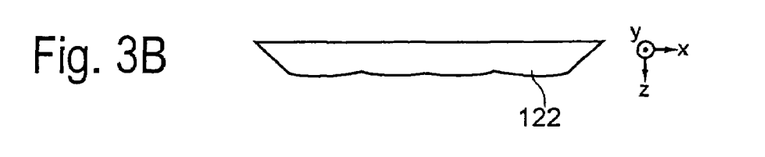
Figure 3C:
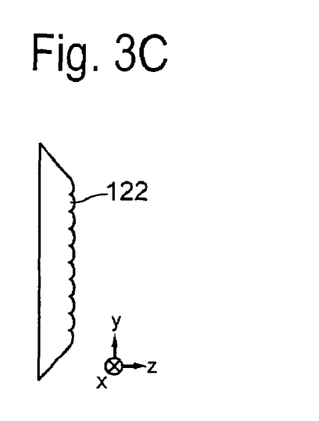
Figure 4A:
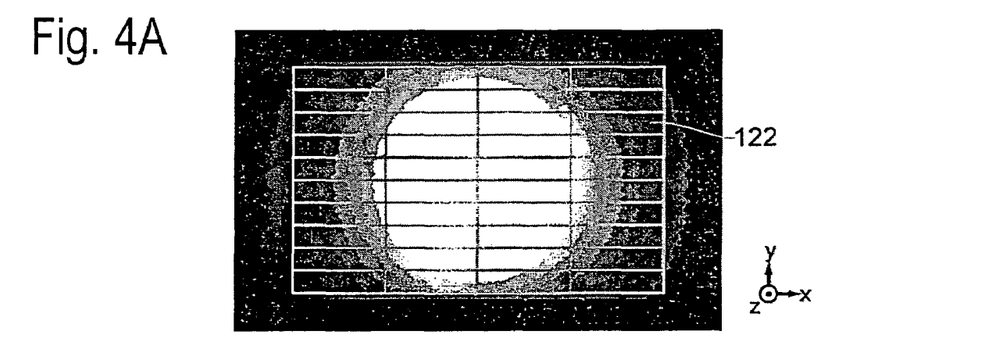
FIGS. 4(a) and 4(b) show by contours a light intensity distribution in the cross section of an illumination light beam.
Figure 4B:
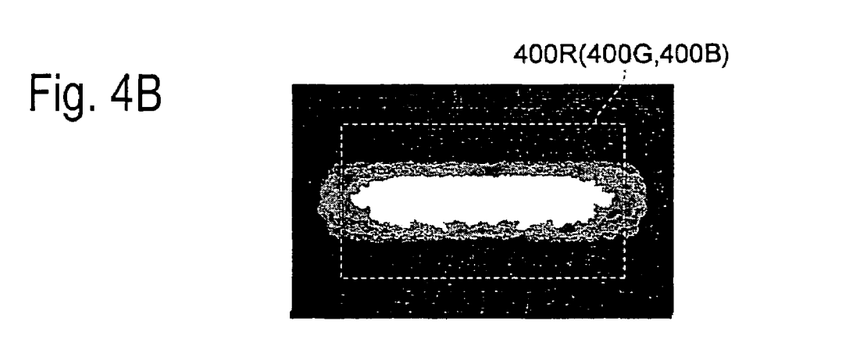

FIGS. 3(a) to 3(c) are views illustrating the structure of the first lens array 120 of the exemplary embodiment. FIG. 3(a) is a view of the first lens array 120 as seen from a direction along the z-axis direction, FIG. 3(b) a view thereof as seen from a direction along the y-axis direction, and FIG. 3(c) a view thereof as seen from a direction along the x-axis direction. FIGS. 4(a) and 4(b) are views showing by contours a light intensity distribution in the cross section of the illumination light beam. FIG. 4(a) is a view showing the light intensity distribution of the illumination light beam on a light incidence surface of the first lens array 120. FIG. 4(b) is a view showing the light intensity distribution of the illumination light beam on the image formation region of the liquid crystal device 400R (also similar in 400G and 400B).

As shown in FIGS. 3(a) to 3(c), the first lens array 120 has the plural small lenses 122 for dividing the illumination light beam emitted from the light source device 110 (see FIGS. 1(a) and 1(b)) into a plurality of partial light beams and a non-lens region 124 provided surrounding the plural small lenses 122.

As shown in FIG. 3(a), the small lenses 122 of the first lens array 120 has a planar shape of a rectangle in which the vertical dimension along the y-axis direction:the horizontal dimension along the x-axis direction=1:4. Consequently, the first lens array 120 can transform the light beam shape in such a manner that the illumination light beam emerging from the illumination system 100 is divided into a plurality of partial light beams having a cross section shape such as follows. That is, the cross section shape is such as to illuminate all of the image formation region in a horizontal direction along the x-axis direction of the image formation region of the liquid crystal devices 400R, 400G, 400B, and such as to illuminate part (about a half) of the image formation region in a vertical direction along the y-axis direction thereof. In other words, the planar shape of the small lenses 122 of the first lens array 120 is set to be substantially similar to the shape of the illumination region of the image formation region of the liquid crystal devices 400R, 400G, 400B.

And, the plurality of partial light beams emerging from the first lens array 120 are superposed on one another by the second lens array 130 and the superposition lens 150, thus illuminating the region of the rectangle in which the vertical dimension along the y-axis direction:the horizontal dimension along the x-axis direction=1:4.

The array of the plural small lenses 122 will now be described in detail.

To more uniformly illuminate the illumination region, it is desirable to divide the illumination light beam from the light source device 100 into a larger number of partial light beams and superpose such partial light beams on one another in the illumination region. However, the pitch of light source images formed by the partial light beams divided by the small lenses 122 of the first lens array 120 must be secured so that the light source images do not overlap each other on the second lens array 130. Therefore, the number of light source images is limited, i.e., the number of small lenses 122 is limited so that the size of the optical systems downstream of the second lens array 130 does not become too large. When the light source images overlap each other, it follows that non-corresponding partial light beams fall on the small lenses of the second lens array 130 corresponding to the respective partial light beams divided by the first lens array. Thus, the non-corresponding partial light beams are not effectively superposed on one another in the illumination region.

When the small lenses 122 having the planar shape of the rectangle in which the vertical dimension along the y-axis direction:the horizontal dimension along the x-axis direction=1:4 are arrayed with the x-axis direction as a column and the y-axis direction as a row, the pitch of the light source images formed by a number of divided partial light beams corresponding to the number of the small lenses 122 becomes narrower in the row direction than in the column direction.

In the projector 1000 of exemplary embodiment, as shown in FIGS. 3(a) to 3(c), the plural small lenses 122 of the first lens array 120 are arrayed in four columns along the x-axis direction. Consequently, the number of plural partial light beams can be sufficiently secured. Therefore, as shown in FIG. 4(b), the light intensity distribution of the illuminated region of the liquid crystal devices 400R, 400G, 400B can be made uniform to a certain degree. Besides, the plural small lenses 122 of the first lens array 120 are arrayed in four columns along the x-axis direction. Therefore, the size of the small lenses 122 of the first lens array 120 can be secured so that the partial light beams emerging from the small lenses 122 of the first lens array 120 are satisfactorily sucked into the opposite second lens array 130. Consequently, it is possible to obtain satisfactory light usability of a light, i.e., a ratio of the light illuminating the illumination region to the light emitted from the light source unit 110 increases.

In the projector 1000 of the exemplary embodiment, as shown in FIGS. 3(a) to 3(c), the plural small lenses 122 of the first lens array 120 are arrayed in 10 rows along the y-axis direction. Consequently, the size of the small lenses 122 of the first lens array 120 can be secured so that the partial light beams emerging from the small lenses 122 of the first lens array 120 are satisfactorily sucked into the opposite second lens array 130. It is possible to obtain satisfactory light usability of the light that, illuminating the illumination region, is directed opposite the light emitted from the light source device 110.

In the projector 1000 of the exemplary embodiment, the plural small lenses 122 of the first lens array 120 are arrayed within the region where, as shown in FIG. 4(a), the horizontal length:the vertical length=8:5 in terms of the ratio of the vertical length along the y-axis direction to the horizontal length along the x-axis direction. That is, the plural small lenses 122 are arrayed in the rectangular region where the ratio of the vertical length along the y-axis direction to the horizontal length along the x-axis direction is about 63%.

Consequently, the ratio of the vertical length along the y-axis direction to the horizontal length along the x-axis direction is 30% or more, thereby making it possible to maintain the light usability of the illumination light beam emerging from the ellipsoidal reflector 114.

According to an exemplary embodiment, the size of the small lenses 122 of the first lens array 120 are secured so that the partial light beams emerging from the small lenses 122 of the first lens array 120 are satisfactorily sucked into the opposite second lens array 130. Furthermore, the number of rows of, and the number of columns of the small lenses 122 of the first lens array 120 are secured so that the illumination light beam can be divided into a plurality of partial light beams. Thereby,it is possible to uniform the light intensity distribution on the liquid crystal devices 400R, 400G, 400B. Besides, the ratio of the vertical length along the y-axis direction to the horizontal length along the x-axis direction is 80% or less, thereby enabling a reduction in size of the apparatus.

In the projector 1000 of the exemplary embodiment, the first lens array 120 has its light incidence surface nearer the ellipsoidal reflector 114 side in relation to a second focal point of the ellipsoidal reflector 114. And, the first lens array 120 is disposed at a position such that the quantity of light of the illumination light beam emitted from the light source device 110 is distributed entirely on this light incidence surface. Consequently, the quantity of light of the illumination light beam emitted from the light source device 110 is distributed entirely on the light incidence surface of the first lens array 120. Accordingly, even if the small lenses 122 are arrayed in four columns to thereby cause the first lens array 120 to have low lens density, an in-plane light intensity distribution characteristic on the illuminated region of the liquid crystal devices 400R, 400G, 400B is prevented from being reduced. Thus, a simplification in manufacturing process and reduction in cost of the first lens array 120 can be achieved.

In this case, preferably, the first lens array 120 is disposed at a position such that no region (shadowed region of the light emitting tube) of excessively small incidence light intensity exists in a central portion of the light incidence surface of the first lens array 120. With such a configuration, the quantity of light of the illumination light beam emitted from the light source device 110 becomes distributed entirely on the light incidence region of the first lens array 120.

2. Ellipsoidal Reflector and Auxiliary Mirror

Figure 2A:
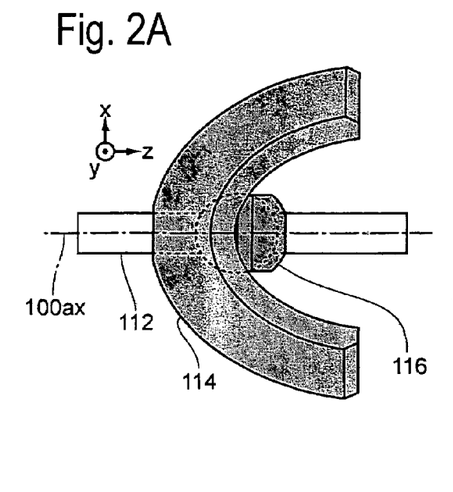
FIGS. 2(a) to 2(d) illustrate the shape of an ellipsoidal reflector and auxiliary mirror of the exemplary embodiment.
Figure 2B:
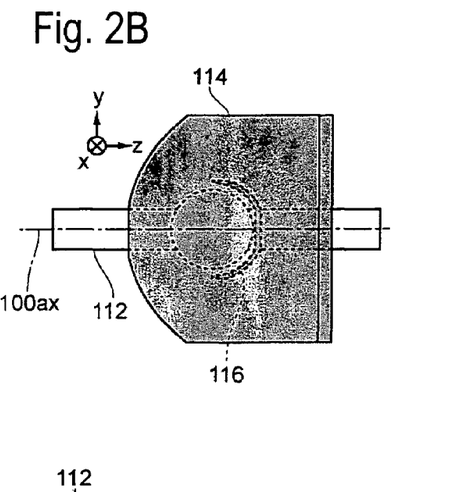
Figure 2C:
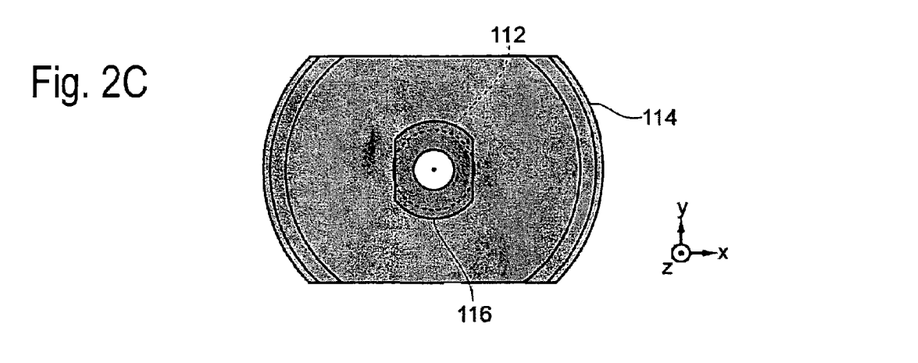
Figure 2D:
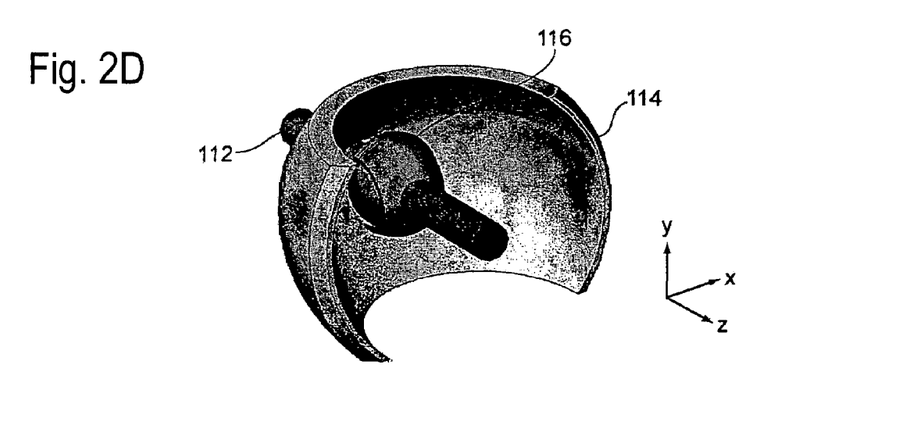

FIGS. 2(a) to 2(d) illustrate the shape of the ellipsoidal reflector 114 and auxiliary mirror 116 of an exemplary embodiment. FIG. 2(a) is a plan view, FIG. 2(b) a side view, FIG. 2(c) a view as seen from the illuminated region side, and FIG. 2(d) a perspective view.

The light emitting tube 112 comprises a light emitting portion including a light emitting center and a pair of seal portions extending from both ends of the light emitting portion.

A reflective concave surface of the ellipsoidal reflector 114 has an ellipsoid of revolution shape with a first focal point and a second focal point. The ellipsoidal reflector 114 is mounted on the one of the pair of seal portions so that the first focal point of the ellipsoidal reflector 114 approximately conforms to the light emitting center of the light emitting tube 112. The ellipsoidal reflector 114 reflects the light emitted from the emitting portion of the light emitting tube 112 to converge on the second focal point.

A reflective concave surface of the auxiliary mirror 116 has a spherical shape. The auxiliary mirror 116 is mounted on the other of the pair of seal portions so that the center of curvature of the auxiliary mirror 116 approximately conforms to the light emitting center of the light emitting tube 112. The auxiliary mirror 116 reflects the light emitted form the emitting portion of the light emitting tube 112 to the illuminated region side (the opposite side to the ellipsoidal reflector 114) in the direction of the ellipsoidal reflector 114. In other words, the auxiliary mirror 116 reflects the light onto the light emitting portion whereby the light reflected by the auxiliary mirror 116 head to the ellipsoidal reflector 114 through the light emitting tube 112. Further the light converge on the second focal point of the ellipsoidal reflector 114 by reflecting on the ellipsoidal reflector 114.

As shown in FIGS. 1 and 2, the auxiliary mirror 116 has the shape in which part of its reflective concave surface is removed so that, in the cross section of the illumination light beam on the light incidence surface of the first lens array 120, the length thereof along the y-axis direction becomes shorter than the length thereof along the x-axis direction. In other words, the auxiliary mirror 116 has its lengthwise direction in the vertical direction when the small lenses 122 having the shape of the rectangle in which the vertical dimension along the y-axis direction:the horizontal dimension along the x-axis direction=1:4 are arrayed within a rectangular region such as follows. That is, the rectangular region is such that the horizontal length:the vertical length=8:5 within a plane perpendicular to the illumination light beam 100ax serving as the central axis of the illumination light beam. Thereby, the auxiliary mirror 116 acts so as to compress the illumination light beam in the vertical direction.

Accordingly, the cross section shape of the illumination light beam reflected off the ellipsoidal reflector 114 is formed such that the vertical dimension along the y-axis direction is smaller than the horizontal dimension along the x-axis direction.

Consequently, the cross section shape of the illumination light beam reflected off the ellipsoidal reflector 114 becomes compatible with the rectangular region of the first lens array 120 which, having the small lenses 122 arrayed therein, is formed such that the horizontal length:the vertical length=8:5. This makes it possible to use the light emitted from the light source device 100 without any waste.

Besides, it can be possible to reduce the vertical dimension, along the y-axis direction, of each downstream optical system including the parallelization lens 118, first lens array 120, second lens array 130, polarization conversion element 140, and superposition lens 150. Thus, a reduction in size of the entire apparatus can be achieved.

Furthermore, in the projector 1000 of the exemplary embodiment, when it is assumed that a light emitted from the light emitting tube 112 is not reflected off but transmitted through the auxiliary mirror 116, as shown in FIGS. 1 and 2, the ellipsoidal reflector 114 has the shape in which a portion of its reflective concave surface required to reflect the light transmitted is removed. In other words, when the auxiliary mirror 116 is shaped to have its lengthwise direction in the vertical direction along the y-axis direction, the ellipsoidal reflector 114 is shaped to have its lengthwise direction in the horizontal direction along the x-axis direction. Consequently, this can reduce the vertical dimension of the ellipsoidal reflector 114 along the y-axis direction, thus enabling a further reduction in size of the entire apparatus.

3. Rotating Prism

Figure 5A:
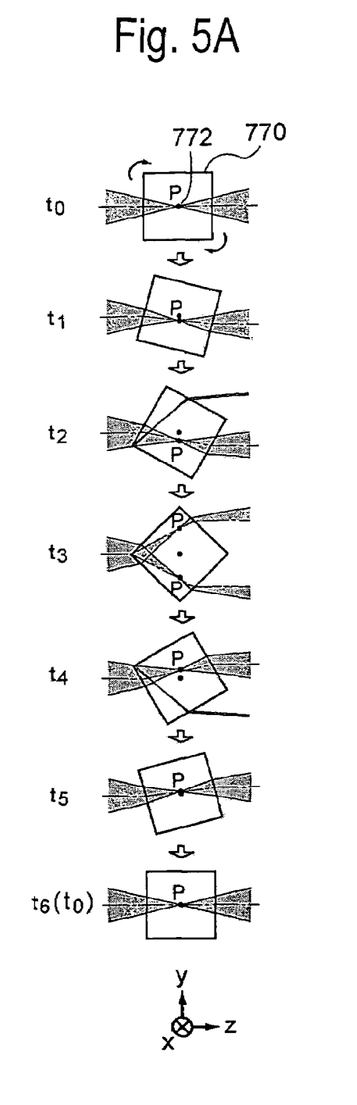
FIG. 5 shows the relationship between rotation of a rotating prism and an illumination condition on a liquid crystal device.
Figure 5B:
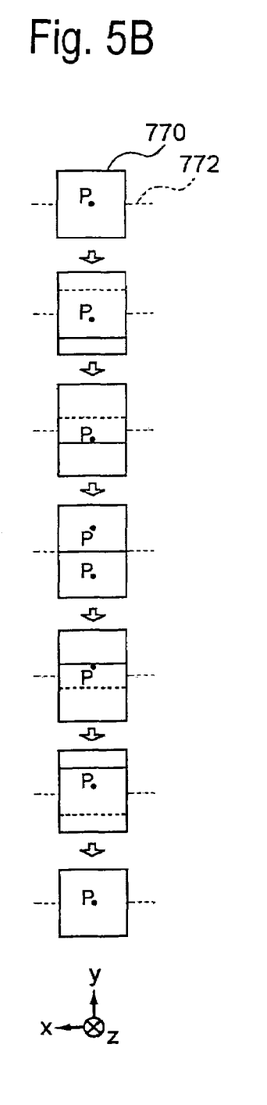
Figure 5C:
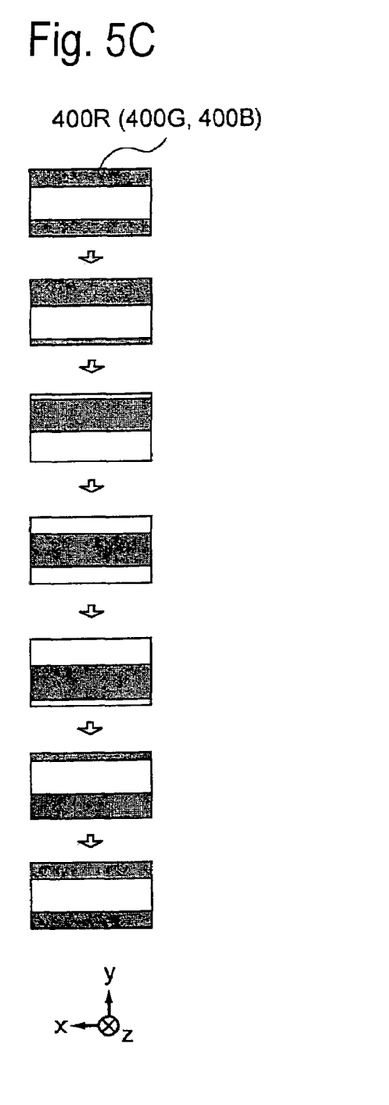

FIGS. 5(a) to 5(c) are diagrams showing the relationship between rotation of the rotating prism 770 and an illumination condition on the liquid crystal device 400R (also similar in 400G and 400B). FIG. 5(a) is a cross sectional diagram of the rotating prism 770 as seen along the rotational axis 772 thereof. FIG. 5(b) is a diagram of the rotating prism 770 as seen along the illumination optical axis 100ax. FIG. 5(c) is a diagram showing the illumination condition of the illumination light beam on the image formation region of the liquid crystal device 400R (also similar in 400G and 400B).

As shown in FIGS. 5(a) and 5(b), an image P is at a virtual center point of the illumination region in which the partial light beams, emerging from the first lens array 120, on the illumination optical axis 100ax are superposed on one another. And, FIGS. 5(a) and 5(b) show how the image P is scrolled around the rotational axis 772 of the rotating prism 770 in a direction (up-and-down direction) substantially perpendicular to the rotational axis 772 as the rotating prism 770 rotates. Resulting, as shown in FIG. 5(c), when the rotating prism 770 rotates, a light irradiation region and a light non-irradiation region become sequentially alternately scrolled in the image formation region of the liquid crystal devices 400R, 400G, 400B.

The ellipsoidal reflector 114, auxiliary mirror 116, first lens array 120, and rotating prism 770 of the projector 1000 of the exemplary embodiment have so far been described in detail. However, the projector 1000 of the exemplary embodiment also has the following features.

The projector 1000 of the exemplary embodiment further includes between the illumination system 100 and the liquid crystal devices 400R, 400G, and 400B, the color separation optical system 200 for separating the illumination light beam emerging from the illumination system 100 into a plurality of color lights. And, a plurality of liquid crystal devices 400R, 400G, and 400B, which modulate the plurality of color lights emerging from the color separation optical system 200 in response to the image information corresponding to the respective color lights, are provided as the liquid crystal devices. Consequently, a projector, which is not significantly reduced in light usability even when configured capable of obtaining smooth and high-quality movie display, becomes capable of providing a three panels type full-color projector excellent in image quality.

In the projector 1000 of the exemplary embodiment, a reflection reducing coating is formed on a light transmission surface of the rotating prism 770. This increases the light transmittance of the rotating prism 770, thus making it possible to minimize a reduction in light-usability, and also reducing a stray light level and increasing contrast.

Consequently, according to the projector 1000 of the exemplary embodiment, out of the vertical and horizontal directions on the image formation region of the liquid crystal devices 400R, 400G, 400B, the illumination light beam has a cross section shape such as to illuminate all of the image formation region in the horizontal direction along the x-axis direction, and such as to illuminate part of the image formation region in the vertical direction along the y-axis direction. Thus, the illumination light beam having such a cross section shape (i.e., a vertically compressed cross section shape) becomes capable of being scanned along the y-axis direction, on the image formation region, in synchronism with a frame rate of the liquid crystal devices 400R, 400G, 400B. Therefore, the light irradiation region and the light non-irradiation region become sequentially alternately scrolled on the image formation region of the liquid crystal devices 400R, 400G, 400B. Resulting, a persistence of vision is reduced, thus providing a projector capable of obtaining smooth and high-quality movie display.

Besides, according to the projector 1000 of an exemplary embodiment, the illumination light beam having the cross section shape compressed in the vertical direction as aforesaid is realized by using as the first lens array 120 a lens array having the planar shape of the small lenses 122 (see FIGS. 3(*a*) to 3(*c*)) compressed in the vertical direction. Therefore, unlike the case in which an optical shutter is used, the illumination light beam emitted from the light source device 110 becomes capable of being led to the image formation region of the liquid crystal devices 400R, 400G, 400B without any waste, thus eliminating a significant reduction in light usability.

Consequently, the projector 1000 of the exemplary embodiment provides a projector that is not significantly reduced in light usability even when configured capable of obtaining smooth and high-quality movie display.

Figure 6A:
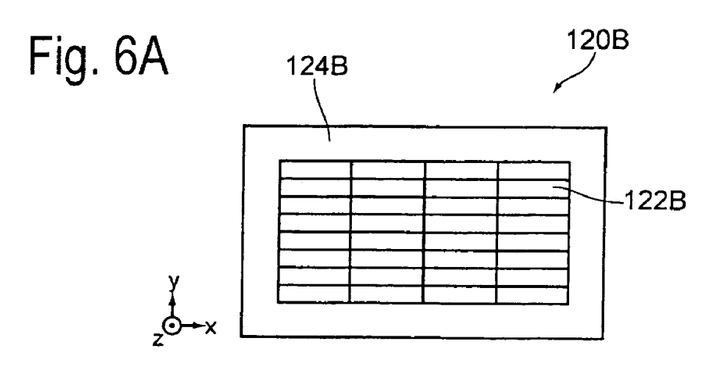
FIGS. 6(a) to 6(c) illustrate the structure of a first lens array of an exemplary embodiment.
Figure 6B:
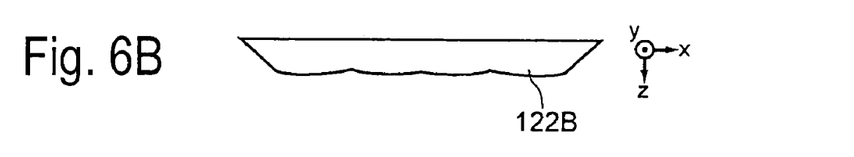
Figure 6C:
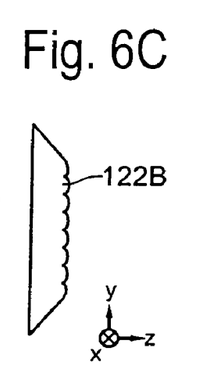
Figure 7A:
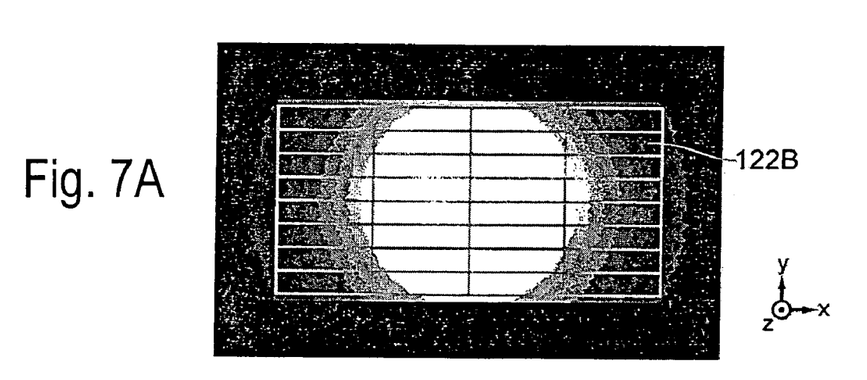
FIGS. 7(a) and 7(b) show by contours a light intensity distribution in the cross section of an illumination light beam.
Figure 7B:
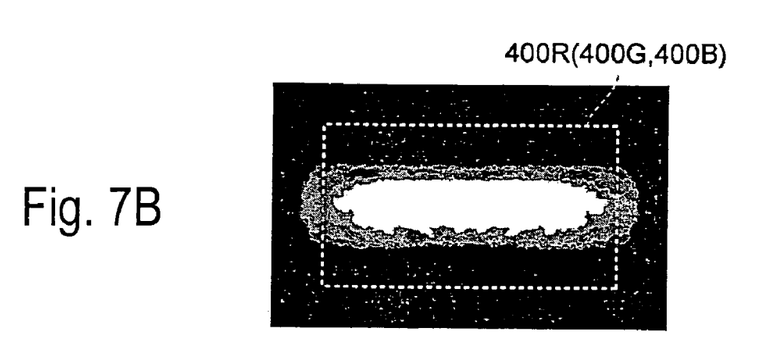

FIGS. 6(*a*) to 6(*c*) illustrate the structure of a first lens array of another exemplary embodiment. FIG. 6(*a*) is a view of the first lens array as seen from a direction along a z-axis direction, FIG. 6(*b*) a view thereof as seen from a direction along a y-axis direction, and FIG. 6(*c*) a view thereof as seen from a direction along an x-axis direction. FIGS. 7(*a*) and 7(*b*) show by contours a light intensity distribution in the cross section of an illumination light beam. FIG. 7(*a*) is a view showing the light intensity distribution of the illumination light beam on a light incidence surface of the first lens array. FIG. 7(*b*) is a view showing the light intensity distribution of the illumination light beam on the image formation region of a liquid crystal device.

A projector 1000B (not shown) of the exemplary embodiment is different in the configuration of the first lens array (and the configuration of a second lens array associated therewith) from the projector 1000 of the exemplary embodiment. That is, in the projector 1000 of the exemplary embodiment, as shown in FIGS. 3(*a*) to 3(*c*), the first lens array 120 has the small lenses 122 arrayed in 4 columns and 10 rows and the non-lens region 124 provided surrounding these small lenses 122. In contrast, in the projector 1000B of the exemplary embodiment, as shown in FIGS. 6(*a*) to 6(*c*), the first lens array 120B has small lenses 122B arrayed in 4 columns and 8 rows and a non-lens region 124B provided surrounding these small lenses 122B.

As shown in FIG. 6(*a*), the small lenses 122B of the first lens array 120B has a planar shape of a rectangle in which the vertical dimension along the y-axis direction:the horizontal dimension along the x-axis direction=1:4. Consequently, the first lens array 120B can form the light beam having a cross section shape such as to illuminate all of the image formation region in a horizontal direction along the x-axis direction of the image formation region of the liquid crystal devices 400R, 400G, 400B (not shown), and such as to illuminate part (about a half) of the image formation region in a vertical direction along the y-axis direction thereof.

Besides, in the projector 1000B of the exemplary embodiment, in the cross section of the illumination light beam on the light incidence surface of the first lens array 120B, as shown in FIG. 7(*a*), the horizontal length:the vertical length=2:1 in terms of the ratio of the vertical length along the y-axis direction to the horizontal length along the x-axis direction. That is, the ratio of the vertical length along the y-axis direction to the horizontal length along the x-axis direction is 50%.

Thus, the projector 1000B of the exemplary embodiment is different in the configuration of the first lens array (and the configuration of the second lens array associated therewith) from the projector 1000 of the exemplary embodiment. However, similar to the projector 1000 of the exemplary embodiment, out of the vertical and horizontal directions on the image formation region of the liquid crystal devices 400R, 400G, 400B, the illumination light beam has a cross section shape such as to illuminate all of the image formation region in the horizontal direction along the x-axis direction, and such as to illuminate part of the image formation region in the vertical direction along the y-axis direction. Thus, the illumination light beam having such a cross section shape (i.e., a vertically compressed cross section shape) becomes capable of being scanned along the y-axis direction, on the image formation region, in synchronism with a frame rate of the liquid crystal devices 400R, 400G, 400B. Therefore, a light irradiation region and a light non-irradiation region become sequentially alternately scrolled on the image formation region of the liquid crystal devices 400R, 400G, 400B. Resulting, the persistence of vision is reduced, thus providing a projector capable of obtaining smooth and high-quality movie display.

Besides, according to the projector 1000B of the exemplary embodiment, the illumination light beam having the cross section shape compressed in the vertical direction as aforesaid is realized by using as the first lens array 120B a lens array having the planar shape of the small lenses 122B compressed in the vertical direction. Therefore, unlike the case in which the optical shutter is used, the illumination light beam emitted from a light source device 110 becomes capable of being led to the image formation region of the liquid crystal devices 400R, 400G, 400B without any waste, thus eliminating a significant reduction in light usability.

Consequently, the projector 1000B of the exemplary embodiment provides a projector that is not significantly reduced in light usability even when configured capable of obtaining smooth and high-quality movie display.

Figure 8A:
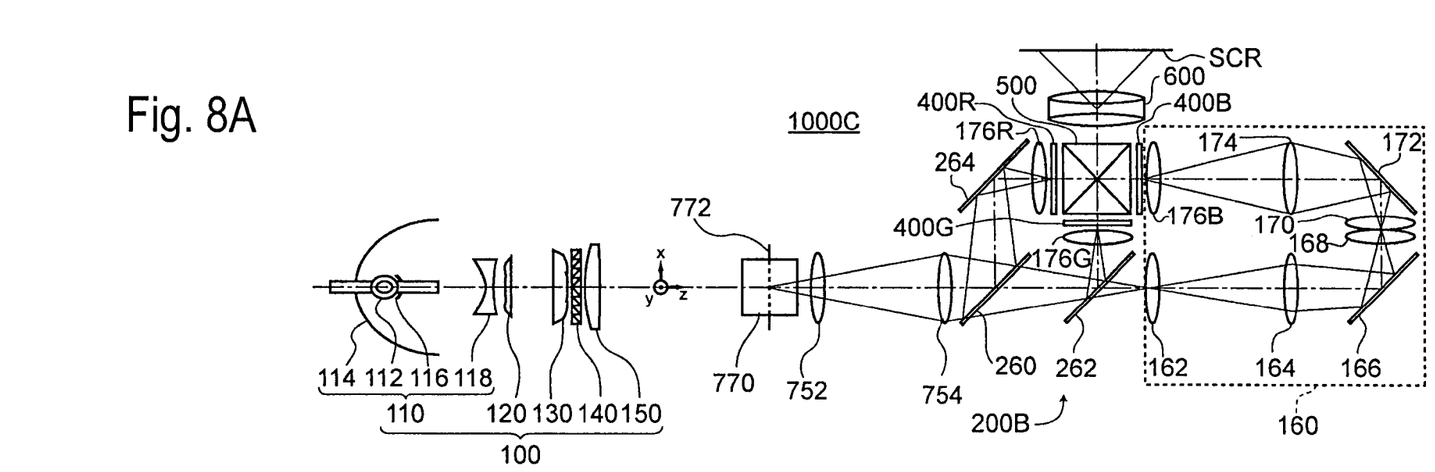
FIGS. 8(a) and 8(b) show the optical system of a projector of an exemplary embodiment.
Figure 8B:
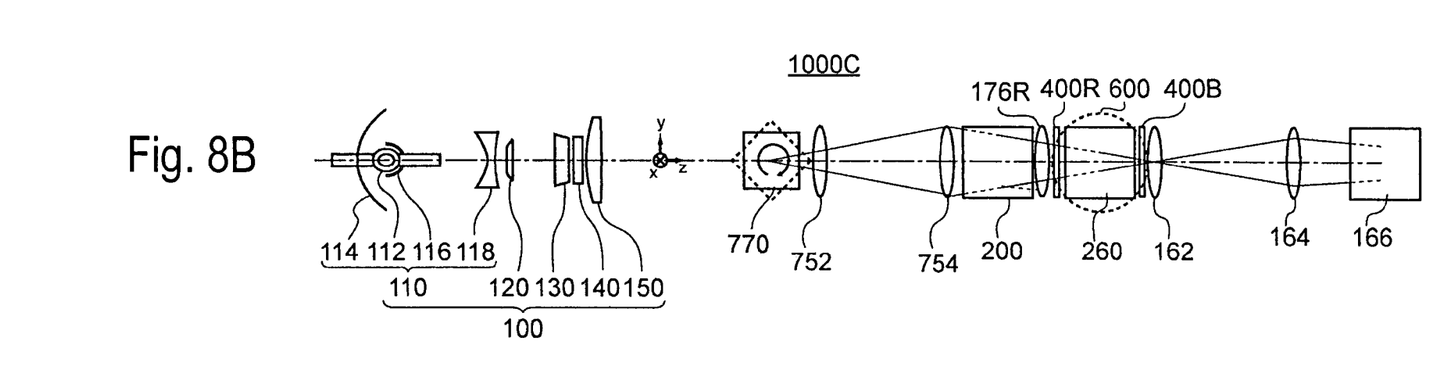

FIGS. 8(*a*) and 8(*b*) show the optical system of a projector of another exemplary embodiment. FIG. 8(*a*) is a top view of the optical system and FIG. 8(*b*) a side view of the optical system.

As shown in FIG. 8(*a*), the projector 1000C of the exemplary embodiment is different in the configuration of a color separation optical system from the projector 1000 of the exemplary embodiment.

That is, the projector 1000C of the exemplary embodiment uses a double relay optical system as the color separation optical system 200B in order that all the directions in which a light irradiation region and a light non-irradiation region are scrolled on each liquid crystal devices 400R, 400G, 400B are directed in the same direction.

Thus, the projector 1000C of the exemplary embodiment is different in the configuration of the color separation optical system from the projector 1000 of the exemplary embodiment. However, similar to the projector 1000 of the exemplary embodiment, out of vertical and horizontal directions on an image formation region of the liquid crystal device 400R, 400G, 400B, an illumination light beam has a cross section shape such as to illuminate all of the image formation region in the horizontal direction along an x-axis direction, and such as to illuminate part of the image formation region in the vertical direction along a y-axis direction. Thus, the illumination light beam having such a cross section shape (i.e., a vertically compressed cross section shape) becomes capable of being scanned along the y-axis direction, on the image formation region, in synchronism with a frame rate of the liquid crystal devices 400R, 400G, 400B. Therefore, a light irradiation region and a light non-irradiation region become sequentially alternately scrolled on the image formation region of the liquid crystal devices 400R, 400G, 400B. Resultingly, the persistence of vision is reduced, thus providing a projector capable of obtaining smooth and high-quality movie display.

Besides, according to the projector 1000C of the exemplary embodiment, the illumination light beam having the cross section shape compressed in the vertical direction as aforesaid is realized by using as a first lens array 120 a lens array having the planar shape of small lenses 122 compressed in the vertical direction. Therefore, unlike the case in which the optical shutter is used, the illumination light beam emitted from a light source device 110 becomes capable of being led to the image formation region of the liquid crystal devices 400R, 400G, 400B without any waste, thus eliminating a significant reduction in light usability.

Consequently, the projector 1000C of the exemplary embodiment can provide a projector that is not significantly reduced in light usability even when configured capable of obtaining smooth and high-quality movie display.

The projector of the embodiment of the invention has so far been described with reference to each aforesaid embodiment. However, the invention is not limited to each aforesaid embodiment and can be embodied in various forms without departing from its spirit and scope. For example, the following modifications can also be made.

The projectors 1000 to 1000C of the aforesaid embodiments are a transmission type projector, but it should be understood that the invention can also be applied to a reflection type projector. Here, the transmission type means that an electro-optic modulator serving as an optical modulator device, such as a transmission type liquid crystal display, is of the type that transmits light. And, the reflection type means that an electro-optic modulator serving as an optical modulator, such as a reflection type liquid crystal display, is of the type that reflects light. Even when the invention is applied to the reflection type projector, the same effects as those of the transmission type projector can be obtained.

The projectors 1000 to 1000C of the aforesaid embodiments each use the liquid crystal device as the electro-optic modulator, but it should be understood that the invention is not limited thereto. Generally, the electro-optic modulator need only modulate incident light in response to image information and may use a micromirror type optic modulator, etc. For example, DMD (Digital Micromirror Device) (trademark of TI Inc.) can be used as the micromirror type optic modulator.

The projectors 1000 to 1000C of the aforesaid embodiments each use the planar shape of the "rectangle in which the vertical dimension:the horizontal dimension=1:4" as the planar shape of the small lenses 122, 122B of the first lens array 120, 120B. However, it should be understood that the invention is not limited thereto, and can also suitably use, for example, the planar shape of a rectangle in which the vertical dimension:the horizontal dimension=9:32, the planar shape of a rectangle in which the vertical dimension:the horizontal dimension=3:8, and like planar shape.

The projectors 1000 to 1000C of the aforesaid embodiments each use the rotating prism 770 as the scanner. However, it should be understood that the invention is not limited thereto, and can also suitably use, for example, a galvanomirror, a polygon mirror, etc.

The projectors 1000 to 1000C of the aforesaid embodiments each use, as the light source device 110, the light source device that has the ellipsoidal reflector 114, the light emitting tube 112 having its light emitting center in the vicinity of a first focal center of the ellipsoidal reflector 114, and the parallelization lens 118. However, it should be understood that the invention is not limited thereto, and can also suitably use a light source device that has a paraboloidal reflector and a light emitting tube having its light emitting center in the vicinity of a focal center of the paraboloidal reflector.

The aforesaid embodiments each cite only an example of the projector using three liquid crystal device 400R, 400G, and 400B. However, it should be understood that the invention is applicable even to a projector using three or less or four or more liquid crystal devices.

The aforesaid embodiments each cite only an example of a front type projector that performs image projection from the direction in which to observe the screen. However, the invention is applicable even to a rear type projector that performs image projection from the direction opposite the direction in which to observe the screen.

Further, while this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
    an illumination system that includes a light source device that emits a substantially parallel illumination light beam to a side of an illuminated region, a first lens array that has plural small lenses that divide the illumination light beam emitted from the light source device into a plurality of partial light beams, a second lens array that has plural small lenses corresponding to the plural small lenses of the first lens array, a polarization conversion element that converts into a polarized light an unpolarized light included in the illumination light beam emerging from the second lens array, and a superposition lens that superimposes the partial light beams emerging from the polarization conversion element on one another in the illuminated region;
    an electro-optic modulator that modulates the illumination light beam emerging from the illumination system in response to image information; and
    a projection optical system that projects the illumination light beam modulated by the electro-optic modulator, in order that the illumination light beam emerging from the illumination system is formed to have a cross section shape such as to illuminate all of an image formation region of the electro-optic modulator in one of vertical and horizontal directions of the image formation region and such as to illuminate part of the image formation region in the other direction, the small lenses of the first lens array have a planar shape compressed in the other direction;

the projector further comprising between the illumination system and the electro-optic modulator, a scanner that scans the illumination light beam along the other direction, on the image formation region, in synchronism with a frame rate of the electro-optic modulator, the light source device further including a light emitting tube having a light emitting portion, an ellipsoidal reflector that reflects a light emitted from the light emitting portion, a parallelization lens that converts the light reflected off the ellipsoidal reflector into a substantially parallel light, and an auxiliary mirror that reflects the light emitted from the light emitting portion to the illuminated region side onto the light emitting portion, the auxiliary mirror having the shape in which part of its reflective concave surface is removed so that, in the cross section of the illumination light beam on a light incidence surface of the first lens array, a length thereof along the other direction becomes shorter than a length thereof along the one direction.

2. The projector according to claim 1, when it is assumed that the light emitted from the light emitting portion is not reflected off, but transmitted through the auxiliary mirror, the ellipsoidal reflector having a shape in which a portion of its reflective concave surface required to reflect the transmitted light is removed.

3. The projector according to claim 1, the plural small lenses of the first lens array being arrayed within a plane perpendicular to a central axis of the illumination light beam and within a substantially rectangular region in which the length along the other direction is shorter than the length along the one direction, the cross section shape of the illumination light beam emerging from the illumination system substantially matching the shape of the substantially rectangular region in which the plural small lenses of the first lens array are arrayed, and the auxiliary mirror being shaped to have its lengthwise direction in the other direction.

4. The projector according to claim 3, the ellipsoidal reflector being shaped to have its lengthwise direction in the one direction.

5. The projector according to claim 1, in the cross section of the illumination light beam on the light incidence surface of the first lens array, a ratio of the length along the other direction to the length along the one direction is 30% to 80%.

6. The projector according to claim 1, the plural small lenses of the first lens array being arrayed in four columns along the one direction.

7. The projector according to claim 1, the plural small lenses of the first lens array being arrayed in 8 to 10 rows along the other direction.

8. The projector according to claim 1, the first lens array, having its light incidence surface nearer the ellipsoidal reflector side in relation to a second focal point of the ellipsoidal reflector, being disposed at a position such that a quantity of light of the illumination light beam emitted from the light source device is distributed entirely on the light incidence surface.

9. The projector according to claim 1, further comprising between the illumination system and the electro-optic modulator, a color separation optical system that separates the illumination light beam emerging from the illumination system into a plurality of color lights, a plurality of electro-optic modulators that modulate the plurality of color lights emerging from the color separation optical system, in response to image information corresponding to the respective color lights, being provided as the electro-optic modulator.

10. The projector according to claim 9, the scanner, disposed at a position substantially conjugate to the electro-optic modulator between the illumination system and the color separation optical system, including a rotating prism that has a rotational axis perpendicular to an illumination optical axis, the rotating prism being configured to rotate to thereby scroll a light irradiation region and a light non-irradiation region sequentially on the electro-optic modulator in synchronism with a frame rate of the electro-optic modulator.

* * * * *